United States Patent
Honea

(10) Patent No.: US 10,788,321 B2
(45) Date of Patent: Sep. 29, 2020

(54) LASER MEASURING DEVICE

(71) Applicant: Phillip Honea, Munford, AL (US)

(72) Inventor: Phillip Honea, Munford, AL (US)

( * ) Notice: Subject to any disclaimer, the term of this patent is extended or adjusted under 35 U.S.C. 154(b) by 415 days.

(21) Appl. No.: 15/903,531

(22) Filed: Feb. 23, 2018

(65) Prior Publication Data

US 2019/0265030 A1 Aug. 29, 2019

(51) Int. Cl.
*G01C 3/08* (2006.01)
*G01S 7/481* (2006.01)
*G01S 17/10* (2020.01)

(52) U.S. Cl.
CPC .............. *G01C 3/08* (2013.01); *G01S 7/4817* (2013.01); *G01S 17/10* (2013.01)

(58) Field of Classification Search
CPC . G01C 3/08; G01S 17/08; G01S 17/10; G01S 17/87; G01S 7/4817; G01S 7/4813; G01S 7/48
USPC ........................................................ 356/4.01
See application file for complete search history.

(56) References Cited

U.S. PATENT DOCUMENTS

| | | | |
|---|---|---|---|
| 5,493,786 A * | 2/1996 | Thomson | G01C 15/002 33/1 G |
| 5,767,953 A | 6/1998 | McEwan | |
| 6,560,560 B1 | 5/2003 | Tachner | |
| 6,877,236 B1 | 4/2005 | Williams | |
| 6,978,676 B2 | 12/2005 | Munro | |
| 7,142,288 B2 | 11/2006 | Stierle | |
| 7,199,866 B2 | 4/2007 | Gogolla et al. | |
| D548,118 S | 8/2007 | Snider et al. | |
| 2014/0016114 A1 * | 1/2014 | Lopez | G01C 15/002 356/4.01 |

FOREIGN PATENT DOCUMENTS

WO      WO03027610      4/2003

* cited by examiner

*Primary Examiner* — Mark Hellner

(57) ABSTRACT

A laser measuring device for remote distance measuring includes a first housing and a second housing that are pivotally coupled. A power module, a microprocessor, and sensing unit are coupled to and positioned in the first housing. The microprocessor is operationally coupled to the power module and the sensing unit is operationally coupled to the microprocessor. The sensing unit is configured to measure an angle between the first housing and the second housing. A first range finder that is coupled to the first housing is configured to measure a first distance between the first housing and a first point. A second range finder that is coupled to the second housing is configured to measure a second distance between the second housing and a second point. The microprocessor is positioned to calculate a distance between the first point and the second point.

10 Claims, 4 Drawing Sheets

LASER MEASURING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art including information disclosed under 37 CFR 1.97 and 1.98

The disclosure and prior art relates to measuring devices and more particularly pertains to a new measuring device for remote distance measuring.

BRIEF SUMMARY OF THE INVENTION

An embodiment of the disclosure meets the needs presented above by generally comprising a first housing and a second housing that are pivotally coupled. A power module, a microprocessor, and sensing unit are coupled to and positioned in the first housing. The microprocessor is operationally coupled to the power module and the sensing unit is operationally coupled to the microprocessor. The sensing unit is configured to measure an angle between the first housing and the second housing. A first range finder that is coupled to the first housing is configured to measure a first distance between the first housing and a first point. A second range finder that is coupled to the second housing is configured to measure a second distance between the second housing and a second point. The microprocessor is positioned to calculate a distance between the first point and the second point.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
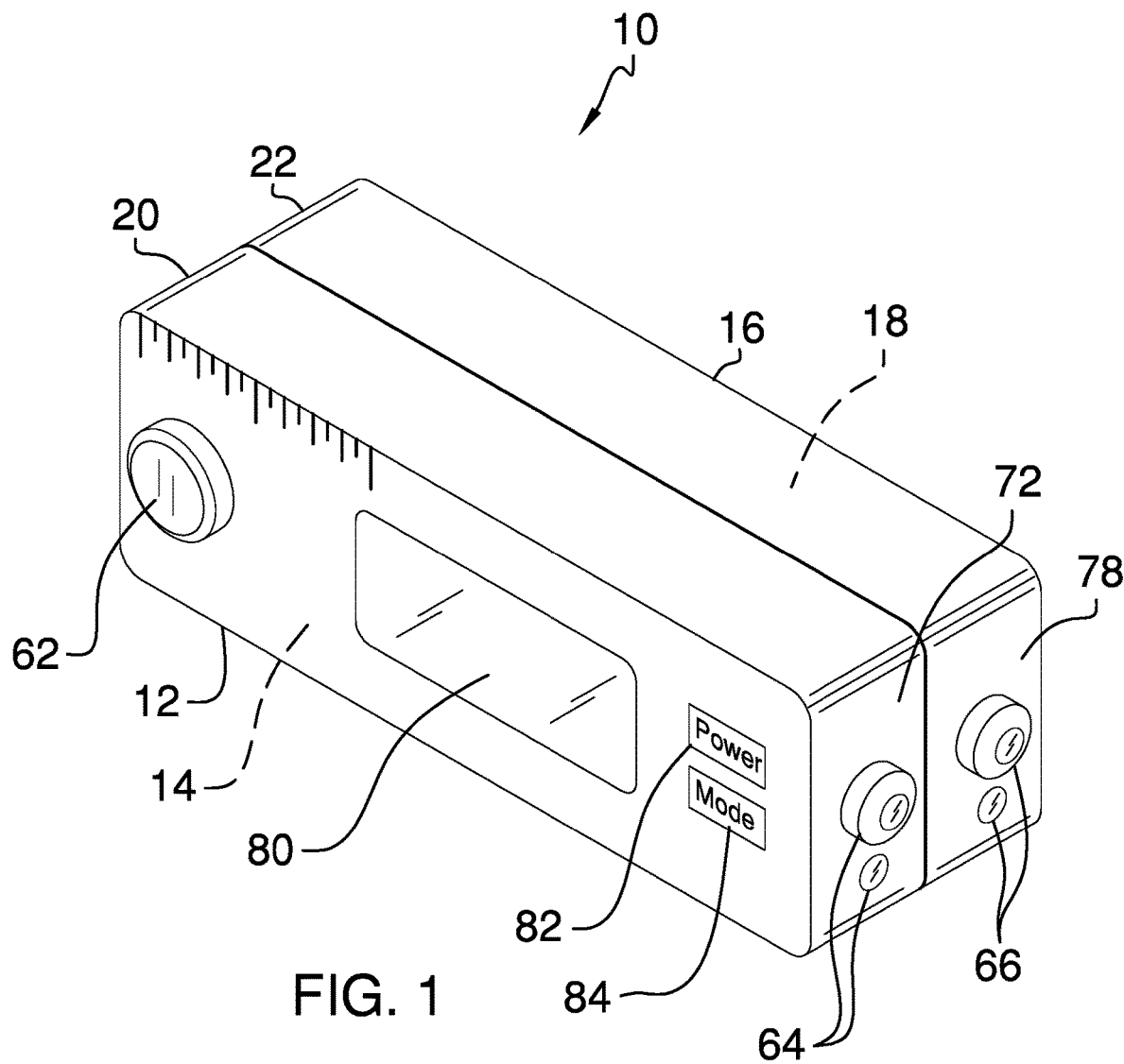
FIG. 1 is an isometric perspective view of a laser measuring device according to an embodiment of the disclosure.

With reference now to the drawings, and in particular to FIGS. 1 through 5 thereof, a new measuring device embodying the principles and concepts of an embodiment of the disclosure and generally designated by the reference numeral 10 will be described.

As best illustrated in FIGS. 1 through 5, the laser measuring device 10 generally comprises a first housing 12 that defines an interior space 14 and a second housing 16 that defines an internal space 18. The second housing 16 and the first housing 12 are pivotally coupled proximate to a second endpoint 20 of the first housing 12 and a second end 22 of the second housing 16. The first housing 12 is substantially rectangularly box shaped. The second housing 16 is substantially dimensionally equivalent to the first housing 12.

A power module 24, a microprocessor 26, and a sensing unit 28 are coupled to the first housing 12 and are positioned in the interior space 14. The power module 24 comprises a battery 30. The microprocessor 26 is operationally coupled to the power module 24. The sensing unit 28 is operationally coupled to the microprocessor 26. The sensing unit 28 is configured to measure an angle between the first housing 12 and the second housing 16 and to communicate the angle to the microprocessor 26.

Figure 5:
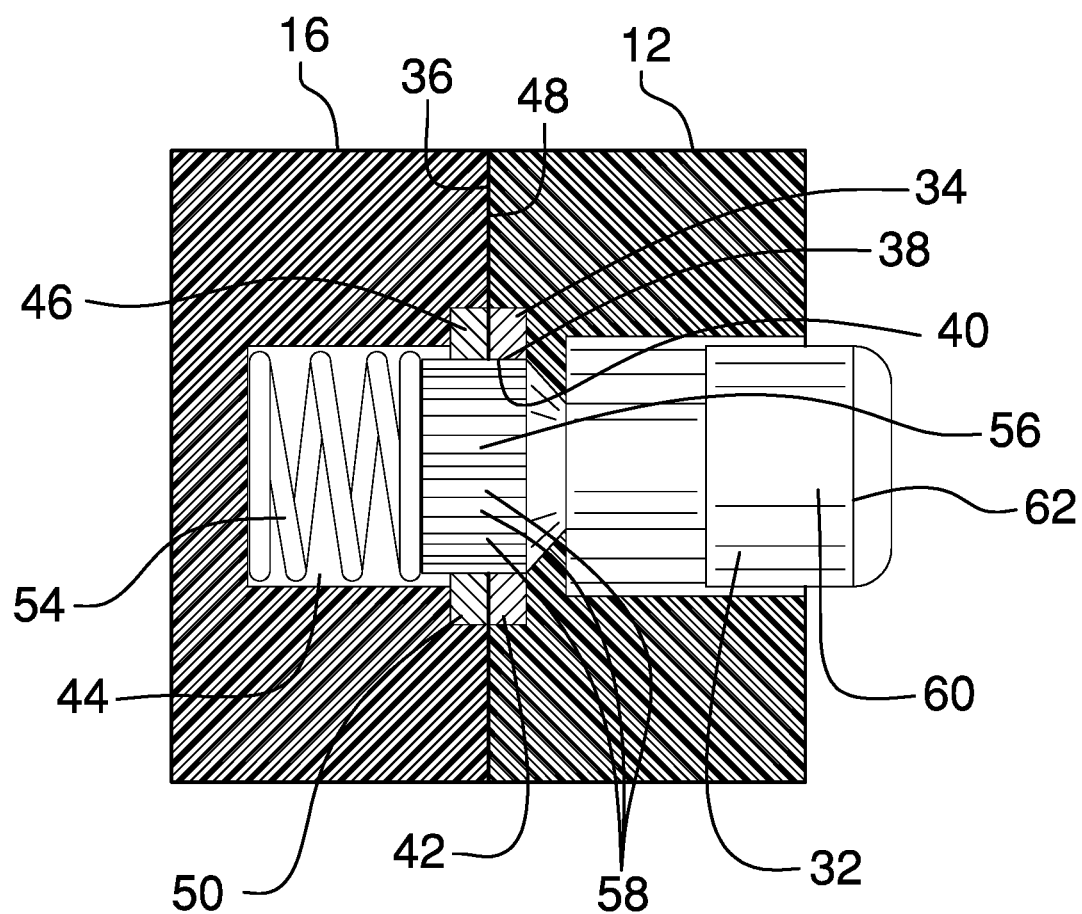
FIG. 5 is a cross-sectional view of an embodiment of the disclosure.

The sensing unit 28 comprises a first channel 32 that extends through the first housing 12 proximate to the second endpoint 20 of the first housing 12, as shown in FIG. 5. A first recess 34 extends radially from the first channel 32 on an inner surface 36 of the first housing 12. A first annulus 38 is coupled to the first housing 12 and is positioned in the first recess 34. A plurality of first teeth 40 is positioned on an inner perimeter 42 of the first annulus 38.

Figure 4:
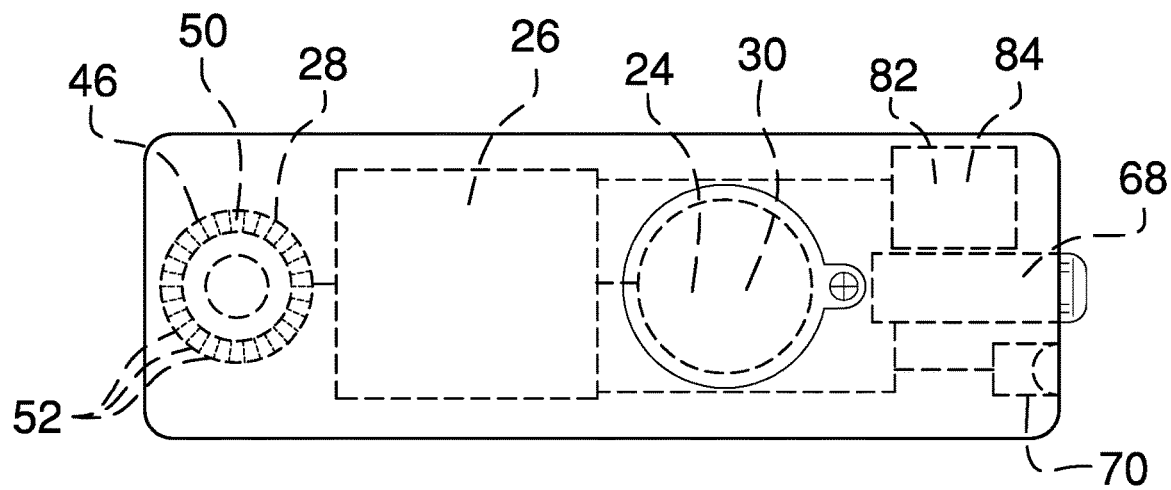
FIG. 4 is a cross-sectional view of an embodiment of the disclosure.

A second channel 44 extends into the second housing 16 proximate to the second end 22 of the second housing 16. The second channel 44 is aligned with the first channel 32. A second recess 46 extends radially from the second channel 44 on an inner face 48 of the second housing 16. A second annulus 50 is coupled to the second housing 16 and is positioned in the second recess 46. The second annulus 50 comprises a plurality of capacitive sensors 52, as shown in FIG. 4. The second annulus 50 comprises copper.

A spring 54 is positioned in the second channel 44. A gear 56 is coupled to the spring 54 and extends through the second annulus 50 and the first annulus 38. A plurality of second teeth 58 that is positioned on the gear 56 is selectively couplable to the plurality of first teeth 40 to fixedly position the first housing 12 relative to the second housing 16.

Figure 2:
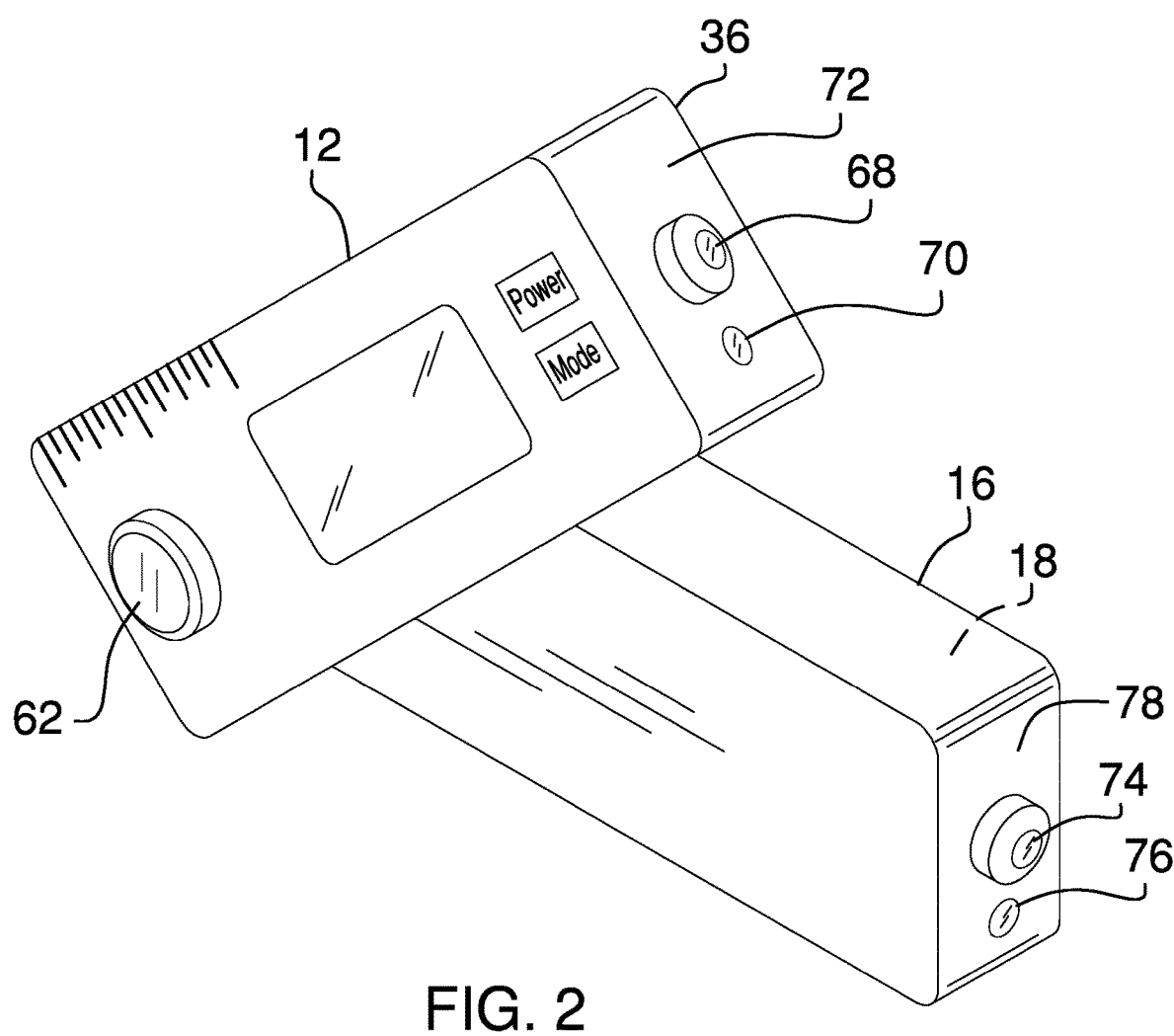
FIG. 2 is an isometric perspective view of an embodiment of the disclosure.
Figure 3:
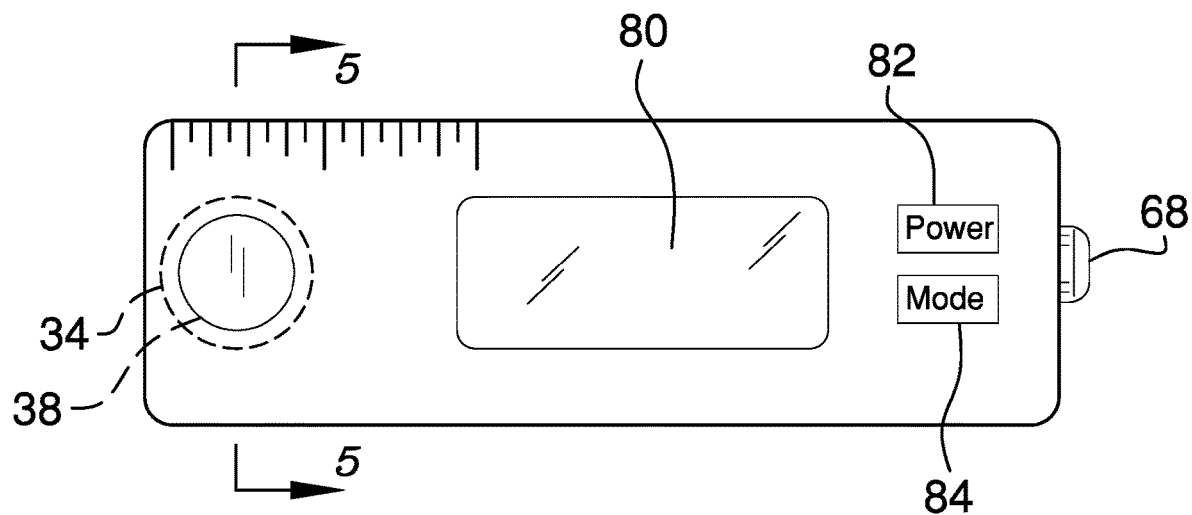
FIG. 3 is a front view of an embodiment of the disclosure.

A pin 60 that is coupled to the gear 56 is opposingly positioned relative to the spring 54 so that the pin 60 extends into the first channel 32. A first button 62 is coupled to the pin 60 distal from the gear 56. The first button 62 protrudes from the first housing 12. The first button 62 is positioned to be depressed to urge the gear 56 into the second channel 44. The first housing 12 is positioned to be selectively rotated relative to the second housing 16, as shown in FIG. 2. The plurality of capacitive sensors 52 is positioned to measure a displacement between the gear 56 and the second annulus 50 and to send an electrical signal to the microprocessor 26. The microprocessor 26 is positioned to determine the angle between the first housing 12 and the second housing 16.

A first range finder 64 is coupled to the first housing 12. The first range finder 64 is operationally coupled to the microprocessor 26. The first range finder 64 is configured to measure a first distance between the first housing 12 and a first point and to communicate the first distance to the microprocessor 26.

A second range finder 66 is coupled to the second housing 16. The second range finder 66 is operationally coupled to the microprocessor 26. The second range finder 66 is configured to measure a second distance between the second housing 16 and a second point and to communicate the second distance to the microprocessor 26. The microprocessor 26 is positioned to calculate a distance between the first point and the second point based on the law of cosines. Specifically, the law of cosines is used to solve for the length of a third side of a triangle when the lengths of the other two sides and the angle between the other two sides are known. The present invention provides for measuring the first distance between the first housing 12 and the first point, as well as the second distance between the second housing 16 and the second point—two sides of a triangle. The angle between the first housing 12 and the second housing 16 is the angle between the two sides of the triangle, allowing the microprocessor 26 to apply the law of cosines to solve for the third side of the triangle and to provide the distance between the first point and the second point.

The first range finder 64 comprises a first laser transmitter 68 and a first laser receiver 70. The first laser transmitter 68 is coupled to the first housing 12 and is positioned in the interior space 14. The first laser transmitter 68 protrudes from a first endpoint 72 of the first housing 12 as shown in FIG. 4. The first laser receiver 70 is coupled to the first endpoint 72 of the first housing 12. The first laser transmitter 68 is configured to lase the first point. The first laser receiver 70 is configured to detect light that is reflected from the first point. The microprocessor 26 to calculate the first distance between the first housing 12 and the first point based on a time required for the light to travel from the first laser transmitter 68 to the first laser receiver 70.

The second range finder 66 comprises a second laser transmitter 74 and a second laser receiver 76. The second laser transmitter 74 is coupled to the second housing 16 and is positioned in the internal space 18. The second laser transmitter 74 protrudes from a first end 78 of the second housing 16 as shown in FIG. 1. The second laser receiver 76 is coupled to the first end 78 of the second housing 16. The second laser transmitter 74 is configured to lase the second point. The second laser receiver 76 is configured to detect light that is reflected from the second point. The microprocessor 26 is positioned to calculate the second distance between the second housing 16 and the second point based on a time required for the light to travel from the second laser transmitter 74 to the second laser receiver 76.

A screen 80 is coupled to the first housing 12. The screen 80 is operationally coupled to the microprocessor 26. The microprocessor 26 is positioned to command the screen 80 to display the distance between the first point and the second point.

A second button 82 is coupled to the first housing 12. The second button 82 is operationally coupled to the microprocessor 26. The second button 82 is depressible. The second button 82 is configured to be depressed a first time to operationally couple the microprocessor 26 to the power module 24. The second button 82 is configured to be depressed a second time to decouple the microprocessor 26 from the power module 24.

A third button 84 is coupled to the first housing 12. The third button 84 is operationally coupled to the microprocessor 26. The third button 84 is depressible. The third button 84 is configured to be depressed to select a respective unit of measurement for displaying the distance between the first point and the second point on the screen 80. The third button 84 also is configured to be depressed to display the angle between the first housing 12 and the second housing 16 on the screen 80.

In use, the first button 62 is positioned to be depressed to urge the gear 56 into the second channel 44. The first housing 12 is positioned to be selectively rotated relative to the second housing 16 to position the first laser transmitter 68 to lase the first point and the second laser transmitter 74 to lase the second point. The first laser receiver 70 and the second laser receiver 76 are configured to detect the light reflected from the first point and the second point, respectively. The microprocessor 26 is positioned to calculate the first distance and the second distance based on the times required for the light to travel from the first laser transmitter 68 to the first laser receiver 70 and from the second laser transmitter 74 to the second laser receiver 76, respectively. The plurality of capacitive sensors 52 is positioned to measure the displacement between the gear 56 and the second annulus 50 and to send the electrical signal to the microprocessor 26. The microprocessor 26 is positioned to determine the angle between the first housing 12 and the second housing 16. The microprocessor 26 then is positioned to calculate the distance between the first point and the second point based on the angle, the first distance, and the second distance.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A laser measuring device comprising:
a first housing defining an interior space;
a second housing defining an internal space, said second housing and said first housing being pivotally coupled proximate to a second endpoint of said first housing and a second end of said second housing;
a power module coupled to said first housing and positioned in said interior space;
a microprocessor coupled to said first housing and positioned in said interior space, said microprocessor being operationally coupled to said power module;
a sensing unit coupled to said first housing and positioned in said interior space, said sensing unit being operationally coupled to said microprocessor, said sensing unit being configured for measuring an angle between said first housing and said second housing and for communicating the angle to said microprocessor;
a first range finder coupled to said first housing, said first range finder being operationally coupled to said microprocessor, wherein said first range finder is positioned on said first housing such that said first range finder is configured for measuring a first distance between said first housing and a first point and for communicating the first distance to said microprocessor;
a second range finder coupled to said second housing, said second range finder being operationally coupled to said microprocessor; and
wherein said second range finder is positioned on said second housing such that said second range finder is configured for measuring a second distance between said second housing and a second point and for communicating the second distance to said microprocessor such that said microprocessor is positioned for calculating a distance between the first point and the second point based on the angle between said first housing and said second housing, the first distance between said first housing and the first point, and the second distance between said second housing and the second point.

2. The device of claim 1, further comprising:
said first housing being substantially rectangularly box shaped; and
said second housing being substantially dimensionally equivalent to said first housing.

3. The device of claim 1, further including said power module comprising a battery.

4. The device of claim 1, further including said sensing unit comprising:
a first channel extending through said first housing proximate to said second endpoint of said first housing;
a first recess extending radially from said first channel on an inner surface of said first housing;
a first annulus coupled to said first housing and positioned in said first recess;
a plurality of first teeth positioned on an inner perimeter of said first annulus;
a second channel extending into said second housing proximate to said second end of said second housing such that said second channel is aligned with said first channel;
a second recess extending radially from said second channel on an inner face of said second housing;
a second annulus coupled to said second housing and positioned in said second recess, said second annulus comprising a plurality of capacitive sensors;
a spring positioned in said second channel;
a gear coupled to said spring and extending through said second annulus and said first annulus such that a plurality of second teeth positioned on said gear are selectively couplable to said plurality of first teeth for fixedly positioning said first housing relative to said second housing;
a pin coupled to said gear, said pin being opposingly positioned relative to said spring such that said pin extends into said first channel;
a first button coupled to said pin distal from said gear such that said first button protrudes from said first housing; and
wherein said first button is positioned on said pin such that said first button is positioned for depressing for urging said gear into said second channel such that said first housing is positioned for selectively rotating relative to said second housing, wherein said plurality of capacitive sensors is positioned for measuring a displacement between said gear and said second annulus and for sending an electrical signal to said microprocessor such that said microprocessor is positioned for determining the angle between said first housing and said second housing.

5. The device of claim 4, further including said second annulus comprising copper.

6. The device of claim 1, further comprising:
said first range finder comprising:
a first laser transmitter coupled to said first housing and positioned in said interior space, said first laser transmitter protruding from a first endpoint of said first housing, and
a first laser receiver coupled to said first endpoint of said first housing;
said second range finder comprising:
a second laser transmitter coupled to said second housing and positioned in said internal space, said second laser transmitter protruding from a first end of said second housing, and
a second laser receiver coupled to said first end of said second housing; and
wherein said first laser transmitter is positioned on said first housing such that said first laser transmitter is configured for lasing the first point, wherein said first laser receiver is positioned on said first housing such that said first laser receiver is configured for detecting light reflected from the first point positioning said microprocessor for calculating the first distance between said first housing and the first point, wherein said second laser transmitter is positioned on said second housing such that said second laser transmitter is configured for lasing the second point, wherein said second laser receiver is positioned on said second housing such that said second laser receiver is configured for detecting light reflected from the second point positioning said microprocessor for calculating the second distance between said second housing and the second point.

7. The device of claim 1, further including a screen coupled to said first housing, said screen being operationally coupled to said microprocessor, wherein said screen is positioned on said first housing such that said microprocessor is positioned for commanding said screen to display the distance between the first point and the second point.

8. The device of claim 1, further including a second button coupled to said first housing, said second button being operationally coupled to said microprocessor, said second button being depressible such that said second button is configured for depressing a first time for operationally coupling said microprocessor to said power module and for depressing a second time for decoupling said microprocessor from said power module.

9. The device of claim 1, further including a third button coupled to said first housing, said third button being operationally coupled to said microprocessor, said third button being depressible such that said third button is configured for selectively depressing for displaying the angle between said first housing and said second housing and for selecting a respective unit of measurement for displaying the distance between the first point and the second point on said screen.

10. A laser measuring device comprising:
  a first housing defining an interior space, said first housing being substantially rectangularly box shaped;
  a second housing defining an internal space, said second housing and said first housing being pivotally coupled proximate to a second endpoint of said first housing and a second end of said second housing, said second housing being substantially dimensionally equivalent to said first housing;
  a power module coupled to said first housing and positioned in said interior space, said power module comprising a battery;
  a microprocessor coupled to said first housing and positioned in said interior space, said microprocessor being operationally coupled to said power module;
  a sensing unit coupled to said first housing and positioned in said interior space, said sensing unit being operationally coupled to said microprocessor, said sensing unit being configured for measuring an angle between said first housing and said second housing and for communicating the angle to said microprocessor, said sensing unit comprising:
    a first channel extending through said first housing proximate to said second endpoint of said first housing,
    a first recess extending radially from said first channel on an inner surface of said first housing,
    a first annulus coupled to said first housing and positioned in said first recess,
    a plurality of first teeth positioned on an inner perimeter of said first annulus,
    a second channel extending into said second housing proximate to said second end of said second housing such that said second channel is aligned with said first channel,
    a second recess extending radially from said second channel on an inner face of said second housing,
    a second annulus coupled to said second housing and positioned in said second recess, said second annulus comprising a plurality of capacitive sensors, said second annulus comprising copper,
    a spring positioned in said second channel,
    a gear coupled to said spring and extending through said second annulus and said first annulus such that a plurality of second teeth positioned on said gear are selectively couplable to said plurality of first teeth for fixedly positioning said first housing relative to said second housing,
    a pin coupled to said gear, said pin being opposingly positioned relative to said spring such that said pin extends into said first channel, and
    a first button coupled to said pin distal from said gear such that said first button protrudes from said first housing positioning said first button for depressing for urging said gear into said second channel such that said first housing is positioned for selectively rotating relative to said second housing, wherein said plurality of capacitive sensors is positioned for measuring a displacement between said gear and said second annulus and for sending an electrical signal to said microprocessor such that said microprocessor is positioned for determining the angle between said first housing and said second housing;
  a first range finder coupled to said first housing, said first range finder being operationally coupled to said microprocessor, wherein said first range finder is positioned on said first housing such that said first range finder is configured for measuring a first distance between said first housing and a first point and for communicating the first distance to said microprocessor, said first range finder comprising:
    a first laser transmitter coupled to said first housing and positioned in said interior space, said first laser transmitter protruding from a first endpoint of said first housing, wherein said first laser transmitter is positioned on said first housing such that said first laser transmitter is configured for lasing the first point, and
    a first laser receiver coupled to said first endpoint of said first housing, wherein said first laser receiver is positioned on said first housing such that said first laser receiver is configured for detecting light reflected from the first point positioning said microprocessor for calculating the first distance between said first housing and the first point;
  a second range finder coupled to said second housing, said second range finder being operationally coupled to said microprocessor, wherein said second range finder is positioned on said second housing such that said second range finder is configured for measuring a second distance between said second housing and a second point and for communicating the second distance to said microprocessor such that said microprocessor is positioned for calculating a distance between the first point and the second point based on the angle between said first housing and said second housing, the first distance between said first housing and the first point, and the second distance between said second housing and the second point, said second range finder comprising:
    a second laser transmitter coupled to said second housing and positioned in said internal space, said second laser transmitter protruding from a first end of said second housing, wherein said second laser transmitter is positioned on said second housing such that said second laser transmitter is configured for lasing the second point, and
    a second laser receiver coupled to said first end of said second housing, wherein said second laser receiver is positioned on said second housing such that said second laser receiver is configured for detecting light reflected from the second point positioning said microprocessor for calculating the second distance between said second housing and the second point;

a screen coupled to said first housing, said screen being operationally coupled to said microprocessor, wherein said screen is positioned on said first housing such that said microprocessor is positioned for commanding said screen to display the distance between the first point and the second point;

a second button coupled to said first housing, said second button being operationally coupled to said microprocessor, said second button being depressible such that said second button is configured for depressing a first time for operationally coupling said microprocessor to said power module and for depressing a second time for decoupling said microprocessor from said power module;

a third button coupled to said first housing, said third button being operationally coupled to said microprocessor, said third button being depressible such that said third button is configured for depressing for selecting a respective unit of measurement for displaying the angle between said first housing and said second housing and for displaying the distance between the first point and the second point on said screen; and wherein said first button is positioned on said pin such that said first button is positioned for depressing for urging said gear into said second channel such that said first housing is positioned for selectively rotating relative to said second housing positioning said first laser transmitter for lasing the first point and said second laser transmitter for lasing the second point, wherein said first laser receiver is positioned on said first housing such that said first laser receiver is configured for detecting the light reflected from the first point positioning said microprocessor for calculating the first distance between said first housing and the first point, wherein said second laser receiver is positioned on said second housing such that said second laser receiver is configured for detecting the light reflected from the second point positioning said microprocessor for calculating the second distance between said second housing and the second point, wherein said plurality of capacitive sensors is positioned for measuring the displacement between said gear and said second annulus and for sending the electrical signal to said microprocessor such that said microprocessor is positioned for determining the angle between said first housing and said second housing positioning said microprocessor for calculating the distance between the first point and the second point based on the angle between said first housing and said second housing, the first distance between said first housing and the first point, and the second distance between said second housing and the second point.

* * * * *